United States Statutory Invention Registration [19]

[11] Reg. Number: H130

McDermott et al. [45] Published: Sep. 2, 1986

[54] TETRAFLUOROETHYLENE HEXAFLUOROPROPYLENE COPOLYMER MODIFIED WITH PERFLUOROPROPYL VINYL ETHER

[75] Inventors: Daniel E. McDermott, Parkersburg, W. Va.; Stanley Piekarski, Marietta, Ohio

[73] Assignee: E. I. Du Pont de Nemours and Company, Wilmington, Del.

[21] Appl. No.: 830,850

[22] Filed: Feb. 18, 1986

[51] Int. Cl.[4] ..... C08F 16/24
[52] U.S. Cl. ..... 526/247
[58] Field of Search ..... 526/247

*Primary Examiner*—John F. Terapane

*Assistant Examiner*—Jack Thomas

[57] ABSTRACT

A terpolymer of tetrafluoroethylene, hexafluoropropylene and perfluoro(propyl vinyl ether) having good stress crack resistance is described.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TETRAFLUOROETHYLENE HEXAFLUOROPROPYLENE COPOLYMER MODIFIED WITH PERFLUOROPROPYL VINYL ETHER

BACKGROUND OF THE INVENTION

A copolymer of tetrafluoroethylene (TFE) and hexafluoropropylene (HFP) has been commercially available for many years. The copolymer (sometimes referred to as TFE/HFP hereinafter) is noted for its stability at high temperature, chemical resistance, and excellent electrical properties. Similarly, a copolymer of TFE and perfluoro(propyl vinyl ether) (PPVE), (TFE/PPVE hereinafter), possesses all the favorable properties of TFE/HFP and in addition can be used for extended periods of time at even higher temperatures than TFE/HFP. A terpolymer of TFE, HFP and PPVE, has high temperature properties, such as tensile strength, intermediate between TFE/HFP and TPE/PPVE).

A major use of TFE/HFP is as insulation and jacketing of wire and cable which is manufactured by applying the molten copolymer onto a rapidly moving wire by means of an extruder running at high temperature using a specially designed die. In order to maximize the line speed of the wire coating line it is advantageous to have the viscosity of the molten polymer be as low as possible in order to maximize the extrusion rate. However, as the melt viscosity (MV) of the TFE/HFP or TFE/PPVE copolymer is lowered, the stress crack resistance (SCR), conveniently measured by the MIT flex life, is also lowered. Low stress crack resistance is manifested by cracks occurring in the wire or cable insulation after cooling, perhaps as long as several years later. SCR is similarly important for other important applications of TFE/HFP such as linings for tanks and valves, tubing, film etc.

It would be of great benefit to increase the stress crack resistance of TFE/HFP at the same MV, or alternatively to lower the MV of TFE/HFP to allow a faster extrusion rate while keeping the SCR at a high level.

SUMMARY OF THE INVENTION

These goals can be accomplished by the incorporation of 0.2 to 2% PPVE into the TFE/HFP polymer chain. The resulting terpolymer of TFE/HFP/PPVE provides a lower PPVE content than heretofore obtained in such terpolymers. The HFP content is between 9 and 17 wt %. The terpolymer of this invention has a significantly higher stress crack resistance than TFE/HFP copolymers.

DESCRIPTION OF THE INVENTION

The terpolymer of this invention can be prepared by a non-aqueous polymerization procedure described in U.S. Pat. Nos. 3,528,954 and 4,029,868. In this procedure, a pressure reactor, e.g., a stainless steel autoclave, is usually used. A solvent which contains the perfluoro(propyl vinyl ether) and a chain transfer agent is added. Usually, the solvent is 1,1,2-trichloro-1,2,2,-trifluoroethane (F-113), but it can be a chlorofluoroalkane or a chlorofluorohydroalkane having from 1–4 carbon atoms and preferably having 1–2 carbon atoms. Examples include $CCl_2F_2$, $CCl_3F$, $CClF_2H$, $CCl_2FCCl_2F$, $CCl_2FCClF_2$ and $CClF_2CClF_2$.

The chain transfer agent is preferably methanol, but can be 2-hydroheptafluoropropane, cyclohexane, chloroform, isopropanol, dichloromethane, ethanol and the like.

The desired amount of hexafluoropropylene is then added and the autoclave heated to the desired reaction temperature; usually 45°–65° C., but sometimes 30°–80° C. The reaction vessel is then pressured with tetrafluoroethylene. The reaction can be carried out at pressures from about 0.3 to 3.4 MPa. Then the initiator is added.

The initiator should be one that is soluble in the solvent and has high activity at the temperature used. Fluorocarbon acyl peroxides of the formula $$\left[X(CF_2)_nC(=O)-O\right]_2$$

where X is H or F and n is an integer of 1–10, are preferred. The preferred initiator is bis(perfluoropropionyl) peroxide. Preferably a solution of the initiator is injected into the reaction vessel continuously, after its initial charge, at a rate at least equal to its decomposition rate. Initiator concentration in the reaction mixture is usually between $0.5\times10^{-4}$ and $5\times10^{-4}$ g/ml.

The pressure is kept constant during the reaction by repressuring with tetrafluoroethylene monomer.

The reaction is then allowed to proceed until the desired degree of polymerizaton is obtained. The contents of the reaction vessel are then discharged and dried to remove solvent. Drying is carried out by ordinary means, e.g., by drying in an air oven.

The terpolymers of this invention may also be prepared by an aqueous emulsion or dispersion polymerization, as is well known. The reaction mixture consists of water, monomers, a dispersing agent, a free-radical polymerization initiator, and, optionally, an unreactive fluorocarbon phase to promote monomer diffusion or to solubilize the initiator and a chain transfer agent such as a low molecular weight hydrocarbon. Polymerization temperatures between 20° and 140° C. may be employed and pressures of 1.4–7.0 MPa are ordinarily used. The HFP and PPVE may be all charged to the vessel initially, or preferably, all the HFP is charged initially while the TFE and PPVE are both charged initially and fed continuously throughout the reaction. The pressure of the reaction vessel is typically held constant throughout the reaction period by feeding TFE monomer. The monomer(s) are fed until the desired final dispersion solids level (15–50%) is achieved. The agitator speed in the reaction vessel may be held constant during the polymerization or it may be varied to control the diffusion of the monomers and thus the reaction rate.

Initiators commonly employed are free-radical initiators such as ammonium and potassium persulfate. The dispersing agent will be present in the amount of between 0.01 and 0.5 percent based on the weight of the aqueous medium and preferably between 0.05 and 0.2 percent.

Melt viscosities were measured according to ASTM D-1238-52T and D2116-81 modified as follows:

The cylinder, orifice and piston tip are made of a corrosion-resistant alloy, Haynes Stellite 19, made by Haynes Stellite Co. The 5.0 g sample is charged to the 9.53 mm inside diameter cylinder, which is maintained at 372°±1° C. Five minutes after the sample is charged to the cylinder, it is extruded through the 2.10 mm diameter, 8.00 mm long square-edged orifice under a load (piston plus weight) of 5.0 kg. This corresponds to a shear stress of 44.8 KPa. The melt viscosity in Pa-s is calculated as 5317 divided by the observed extrusion rate in g/min.

The films used for the IR measurements were compression molded at 350° C. under pressure and cooled by quenching the film in ice water. A film thickness of 0.1 mm was used. The IR measurements were performed on a Nicolet Model 5DX FTIR. The infrared methods were calibrated using $F^{19}$ NMR.

The HFP content in the co- or terpolymers described herein was determined by measurement of the ratio of the IR absorbance at 982 $cm^{-1}$ to that at 2367 $cm^{-1}$. In the terpolymers a correction to the calculation of % HFP must be made because of an interference due to a PPVE band which has an absorbance maximum at 993 $cm^{-1}$. The equation used is:

$$HFP\,(\text{wt }\%) = 3.2\left[\frac{\text{ABSORBANCE AT 982 cm}^{-1}}{\text{ABSORBANCE AT 2367 cm}^{-1}} - (0.1 \times PPVE\,(\text{wt }\%))\right]$$

The PPVE content of the terpolymers described herein was determined by measurement of the ratio of the IR absorbance at 1335 $cm^{-1}$ to that a 2367 $cm^{-1}$. The baseline correction at 1335 $cm^{-1}$ is determined using a reference film of approximately the same HFP content and thickness as the sample film but not containing PPVE. The equation is:

$$PPVE\,(\text{wt }\%) = 2.2 \times \frac{\text{ABSORBANCE AT 1335 cm}^{-1}}{\text{ABSORBANCE AT 2367 cm}^{-1}}$$

The MIT folding endurance tester described in ASTM D-2176-63T with a jaw opening of 0.25 mm was used for determination of the flex life. The determinations were carried out on ice-water quenched films of approximately 0.19 mm to 0.23 mm thickness. Pieces approximately 90 mm long and 12.7 mm wide were clamped into the jaws of the flex tester and placed under a load of 1.2 kg. The MIT flex tester folds the film through an angle of about 135° C. to the right and about 135° to the left at a rate of about 175 cycles per minute. The number of cycles until failure is recorded on a counter on the machine. The determinations were carried out in triplicate. The average of the three determinations was recorded.

The melt points were determined by Differential Scanning Calorimetry using a Du Pont Model 990 Thermal Analyzer. The minimum of the melting endotherm was taken as the melt point. Twelve to fourteen mg samples were taken from the same film as used to determine the MIT flex life.

EXAMPLE 1 AND COMPARISONS A AND B

EXAMPLE 1

Into a clean, stainless steel, horizontal, agitated autoclave having a volume of 36 liters were placed 22.7 kg of demineralized water and 23 g of ammonium perfluorocaprylate. The autoclave was closed, heated to 95° C. and pressure tested for leaks at 4.1 MPa with $N_2$. Full cooling was applied to the autoclave until a temperature of 65° C. was obtained. The autoclave was evacuated and purged three times with tetrafluoroethylene (TFE) and evacuated again. The autoclave was cooled to 30° C. Then 60 ml of perfluoro(propyl vinyl ether) (PPVE) was added to the autoclave. The agitator was turned on and, rotated at 38 rpm. The temperature of the autoclave was increased to 95° C. The autoclave was pressured to 2.9 MPa with hexafluoropropylene (HFP) then to a final pressure of 4.1 MPa with TFE. A freshly prepared solution of 0.0088M ammonium persulfate in demineralized water was pumped to the autoclave at 50 ml/min for 12 minutes. After the polymerization had started (detected by a 70 KPa pressure drop) a solution of 0.044M potassium persulfate was pumped at a rate of 10 ml/min throughout the reaction period. PPVE was also added at a rate of 0.2 ml/min throughout the reaction period. TFE was added to the autoclave throughout the reaction period in order to keep the pressure constant at 4.1 MPa and the agitator speed was varied in order to keep the TFE addition rate at 0.050 kg/min. After 7.93 kg of TFE had been added to the autoclave (after the beginning of polymerization) the addition of TFE, PPVE and potassium persulfate solution was all stopped. The agitator was turned off, cooling water was added to the jacket of the autoclave and the reactor was vented. The autoclave was then purged with $N_2$ to remove any residual monomers and the aqueous dispersion was discharged from the autoclave.

The dispersion was coagulated using vigorous stirring to yield a terpolymer fluff. The fluff was partially dewatered by squeezing under pressure then dried at 150° C. to remove the remaining moisture. The fluff was then heated at 350°-370° C. for two hours in the presence of air and water to yield a foamy block of TFE/HFP/PPVE terpolymer. The block was shredded into smaller pieces using a cutter with rotating knife blades. All tests were run on the resulting shred.

COMPARISON A

Into a clean, stainless steel, horizontal, agitated autoclave having a volume of 36 liters were placed 22.7 kg of demineralized water and 23 g of ammonium perfluorocaprylate. The autoclave was closed, heated to 95° C. and pressure tested for leaks at 4.1 MPa with $N_2$. Full cooling was applied to the autoclave until a temperature of 65° C. was obtained. The autoclave was evacuated and purged three times with tetrafluoroethylene (TFE) and evacuated again. The agitator was turned on and rotated at 38 rpm. The temperature of the autoclave was increase to 95° C. The autoclave was pressured to 2.9 MPa with hexafluoropropylene (HFP) then to a final pressure of 4.1 MPa with TFE. A freshly prepared solution of 0.0074M potassium persulfate in demineralized water was pumped to the autoclave at 50 ml/min for 12 minutes. After the polymerization had started (detected by a 70 KPa pressure drop) a solution of 0.063M potassium persulfate was pumped at a rate of 10 ml/min throughout the reaction period. TFE was also added to the autoclave throughout the reaction period in order to keep the pressure constant at 4.1 MPa and the agitator speed was varied in order to keep the TFE addition rate at 0.050 kg/min. After 7.93 kg of TFE had been added to the autoclave (after the beginning of polymerization) the addition of TFE and potassium persulfate solution was stopped. The agitator was turned off, cooling water was added to the jacket of the autoclave and the reactor was vented. The autoclave was then purged with $N_2$ to remove any residual monomers and the aqueous dispersion was discharged from the autoclave.

The dispersion was coagulated using vigorous stirring to yield a copolymer fluff. The fluff was partially dewatered by squeezing under pressure then dried at 150° C. to remove the remaining moisture. The fluff was then heated at 350°-370° C. for two hours in the presence of air and water to yield a foamy block of TFE/HFP copolymer. The block was shredded into smaller pieces using a cutter with rotating knife blades. All tests were run on the resulting shred.

The properties of the terpolymer in Example 1 and the copolymer in Comparison A are shown in Table 1. Included also are the properties obtained on a TFE/HFP/PPVE terpolymer with composition such as that described in U.S. Pat. No. 4,029,868, as comparison B.

TABLE 1

| | WT % | | MELT VISCOSITY | MELT POINT | MIT FLEX LIFE |
|---|---|---|---|---|---|
| | HFP | PPVE | ($\times 10^{-3}$ Pa-s) | °C. | (Cycles) |
| Example 1 | 12.0 | 0.7 | 8.1 | 260 | 18,200 |
| Comparison A | 11.7 | — | 8.5 | 260 | 6,700 |
| Comparison B | 4.1 | 1.3 | 10.4 | 295 | 9,800 |

EXAMPLE 2 AND COMPARISON C

EXAMPLE 2

Into a clean, stainless steel, horizontal, agitated autoclave having a volume of 36 liters were placed 22.7 kg of demineralized water and 20 g of a mixture of perfluorocaprylate ($C_4$-$C_{16}$)ethanesulfonic acids (ave=$C_8$) diluted to 450 g with water. The autoclave was closed, heated to 95° C. and pressure tested for leaks at 4.1 MPa with $N_2$. Full cooling was applied to the autoclave until a temperature of 65° C. was obtained. The autoclave was evacuated and purged three times with tetrafluoroethylene (TFE) and evacuated again. The autoclave was cooled to 30° C. Then 60 ml of perfluoro(propyl vinyl ether (PPVE) was added to the autoclave. The agitator was turned on and rotated at 38 rpm. The temperature of the autoclave was increased to 95° C. The autoclave was pressured to 2.9 MPa with hexafluoropropylene (HFP) then to a final pressure of 4.1 MPa with TFE. A freshly prepared solution of 0.0175M ammonium persulfate in demineralized water was pumped to the autoclave at 50 ml/min for 6 minutes. After the polymerization had started (detected by a 70 KPa pressure drop) a solution of 0.089M potassium persulfate was pumped at a rate of 10 ml/min throughout the reaction period. PPVE was also added at a rate of 0.2 ml/min throughout the reaction period in order to keep the pressure constant at 4.1 MPa and the agitator speed was varied in order to keep the TFE addition rate at 0.050 kg/min. After 7.93 kg of TFE had been added to the autoclave (after the beginning of polymerization) the addition of TFE, PPVE and ammonium persulfate solution was stopped. The agitator was turned off, cooling water was added to the jacket of the autoclave and the reactor was vented. The autoclave was then purged with $N_2$ to remove any residual monomers and the aqueous dispersion was discharged from the autoclave.

The dispersion was coagulated using vigorous stirring to yield a terpolymer fluff. The fluff was partially dewatered by squeezing under pressure then dried at 150° C. to remove the remaining moisture. The fluff was then heated at 350°-370° C. for two hours in the presence of air and water to yield a foamy block of TFE/HFP/PPVE terpolymer. The block was shredded into smaller pieces using a cutter with rotating knife blades. All tests were run on the resulting shred.

COMPARISON C

Into a clean, stainless steel, horizontal, agitated autoclave having a volume of 36 liters were placed 22.7 kg of demineralized water 20 g of a mixture of perfluorocaprylate ($C_4$-$C_{16}$)ethanesulfonic acids (ave=$C_8$) diluted to 450 g with water. The autoclave was closed, heated to 95° C. and pressure tested for leaks at 4.1 MPa with $N_2$. Full cooling was applied to the autoclave until a temperature of 65° C. was obtained. The autoclave was evacuated and purged three times with tetrafluoroethylene (TFE) and evacuated again. The agitator was turned on and rotated at 38 rpm. The temperature of the autoclave was increased to 95° C. The autoclave was pressured to 2.9 MPa with hexafluoropropylene (HFP) then to a final pressure of 4.1 MPa with TFE. A freshly prepared solution of 0.0175M ammonium persulfate in demineralized water was pumped to the autoclave at 50 ml/min for 6 minutes. After the polymerization had started (detected by a 70 KPa pressure drop) a solution of 0.059M potassium persulfate was pumped at a rate of 10 ml/min throughout the reaction period. TFE was also added to the autoclave throughout the reaction period in order to keep the pressure constant at 4.1 MPa and the agitator speed was varied in order to keep the TFE addition rate at 0.050 kg/min. After 7.93 kg of TFE had been added to the autoclave (after the beginning of polymerization) the addition of TFE, and potassium persulfate solution was stopped. The agitator was turned off, cooling water was added to the jacket of the autoclave and the reactor was vented. The autoclave was then purged with $N_2$ to remove any residual monomers and the aqueous dispersion was discharged from the autoclave.

The dispersion was coagulated using vigorous stirring to yield a copolymer fluff. The fluff was partially dewatered by squeezing under pressure then dried at 150° C. to remove the remaining moisture. The fluff was then heated at 350°-370° C. for two hours in the presence of air and water to yield a foamy block of TFE/HFP copolymer. The block was shredded into smaller pieces using a cutter with rotating knife blades. All tests were run on the resulting shred.

The properties of the terpolymer in Example 2 and the copolymer in Comparison C are shown in Table 2.

TABLE 2

| | WT % | | MELT VISCOSITY | MELT POINT | MIT FLEX LIFE |
|---|---|---|---|---|---|
| | HFP | PPVE | ($\times 10^{-3}$ Pa-s) | °C. | (Cycles) |
| Example 2 | 13.3 | 0.7 | 4.2 | 251 | 14,400 |
| Comparison C | 14 | — | 4.0 | 250 | 6,000 |

I claim:

1. A perfluorinated terpolymer composition containing:

(a) tetrafluoroethylene (b) between 9 and 17 percent by weight hexafluoropropylene.

(c) between 0.2 and 2 percent by weight perfluoro(propyl vinyl ether).

* * * * *